Oct. 26, 1948.  W. T. STEPHENSON  2,452,080
METHOD OF CONTINUOUSLY EXTRUDING VINYLIDENE CHLORIDE
POLYMER TUBES AND STRETCHING THE SAME
Filed Jan. 13, 1947  4 Sheets-Sheet 1

Inventor
Wilbur T. Stephenson
By
Griswold & Burdick
Attorneys

Oct. 26, 1948.  W. T. STEPHENSON  2,452,080
METHOD OF CONTINUOUSLY EXTRUDING VINYLIDENE CHLORIDE
POLYMER TUBES AND STRETCHING THE SAME
Filed Jan. 13, 1947  4 Sheets-Sheet 3

Inventor
Wilbur T. Stephenson
Griswold & Burdick
Attorneys

Oct. 26, 1948.  W. T. STEPHENSON  2,452,080
METHOD OF CONTINUOUSLY EXTRUDING VINYLIDENE CHLORIDE
POLYMER TUBES AND STRETCHING THE SAME
Filed Jan. 13, 1947  4 Sheets-Sheet 4

INVENTOR.
Wilbur T. Stephenson
BY
Griswold & Burdick
ATTORNEYS

Patented Oct. 26, 1948

2,452,080

UNITED STATES PATENT OFFICE 2,452,080

METHOD OF CONTINUOUSLY EXTRUDING VINYLIDENE CHLORIDE POLYMER TUBES AND STRETCHING THE SAME

Wilbur T. Stephenson, Midland, Mich., assignor to The Dow Chemical Company, Midland, Mich., a corporation of Delaware Application January 13, 1947, Serial No. 721,738

3 Claims. (Cl. 18—47.5)

This invention relates to a continuous method for making plastic tubes and film, and particularly to a method whereby fully oriented tubing and film may be made from normally crystalline vinylidene chloride polymers. This application is a continuation-in-part of my application Serial No. 493,229 filed July 2, 1943, now abandoned, which was in turn a continuation-in-part of my earlier application Serial No. 394,061, filed May 19, 1941, now abandoned.

Many plastics and polymers are amorphous when examined macroscopically, microscopically, or by X-ray methods. Although such amorphous plastics and polymers can be fabricated to produce useful articles, it is not usually possible to cold-work them to increase their strength to any marked degree. This is in contrast with certain polymers, such as the polymer of vinylidene chloride alone and many of its copolymers wherein vinylidene chloride predominates, herein referred to as "normally crystalline vinylidene chloride polymers," which are submicroscopically crystalline as shown by X-ray diffraction patterns, and which may be supercooled without substantial crystallization and cold-worked at ordinary room temperatures to increase their strength. When for example, the polymer of vinylidene chloride, or one of its copolymers or plastic compositions which is normally crystalline to the X-ray, is heated to above its fusion temperature and then chilled rapidly it is obtained as a soft, flexible but temporarily non-crystalline solid and is said to be supercooled. In such condition it has relatively little strength but it may be plastically deformed or cold-worked at or near room temperature and its strength greatly increased by any of several cold-working operations as is disclosed by Wiley in U. S. Patent No. 2,183,602. When the supercooled material, e. g. in filament or film form, is cold-worked by simple uni-directional stretching, the stretched article is again crystalline and has very high strength in the direction of stretching. X-ray examination shows it to have preferential orientation in the same direction.

Such uni-directionally oriented articles are, however, relatively weak in a direction transverse to the direction of their orientation and, in the case of films which have been stretched in one direction only, are subject to splitting or fibering when under stress transverse to the direction of orientation. In cases where it is possible to cold-work the supercooled material by multi-directional stretching, e. g. by stretching in directions at right angles to each other, more nearly uniform strength in all directions is obtained. X-ray examination of articles which have been stretched multi-directionally shows them to have a fully oriented crystalline structure. Such multi-directional stretching is, however, usually difficult to carry out on most shaped articles. Although it is common practice to form films of noncrystalline polymers by slitting tubes longitudinally, it has heretofore been possible to cold-work tubes made of a normally crystalline polymer in one direction only, i. e. longitudinally, and consequently films obtained by slitting such tubes have invariably been weak in one direction.

It is, accordingly, an object of the present invention to provide a method whereby thin tubes of film-like thickness of normally crystalline vinylidene chloride polymer may be produced having a high strength both longitudinally and transversely. An additional object is to provide a continuous method whereby multi-directionally stretched tubes may be made from a normally crystalline vinylidene chloride polymer. Other and related objects will become apparent as the description of the invention proceeds.

In practicing the invention a tube of fused, normally crystalline vinylidene chloride polymer is extruded continuously from a die head and withdrawn from the die orifice through a cooling bath wherein it is supercooled. The diameter of the supercooled tube and the thickness of its walls may be controlled by maintaining a predetermined and substantially constant head of liquid within the tube during cooling and by regulating the rate of withdrawal of the tube from the die orifice. The supercooled tube is passed between two separate pairs of pinch rolls, each pair of which forwards the tube and pinches its walls firmly together. A gas is maintained in the section of the tube between the two pairs of pinch rolls in amount sufficient to distend the section over a portion of its length to form an elongated bubble and thus to cold-stretch the supercooled tube radially and longitudinally, but insufficient to burst it. The wall of the tube is thus cold-stretched in a direction parallel to the longitudinal axis of the tube and simultaneously in a direction at right angles thereto. The second of the two pairs of rolls is run at a peripheral speed enough greater than that of the first pair to take up most of the slack in the section of tube between the two pairs of rolls and, if desired, they may even be run enough faster to increase the amount of longitudinal cold-stretching of the tube over that caused by the gas maintained within the tube. The cold-stretched flattened tube may be wound on a reel for further utilization or it may be slit lengthwise or the flattened edges may be trimmed from it to form a film.

The multi-directionally stretched tube produced by the method of the invention is characterized by several advantageous features when compared with tubes made from normally crystalline vinylidene chloride polymers by hitherto known methods. Thus, due to the orientation of the crystallites of the polymer in more than one direction, the tube is strong not only along the longitudinal axis but also transversely thereto and as a result it has a higher bursting strength than it has heretofore been possible to obtain. When the tube is slit there is obtained a film of substantially uniform thickness having a high strength in all directions rather than in one direction only.

Reference is made to the accompanying drawing in which in the interest of clarity certain features are shown on a somewhat exaggerated scale.

In the said drawing.

Figure 1:
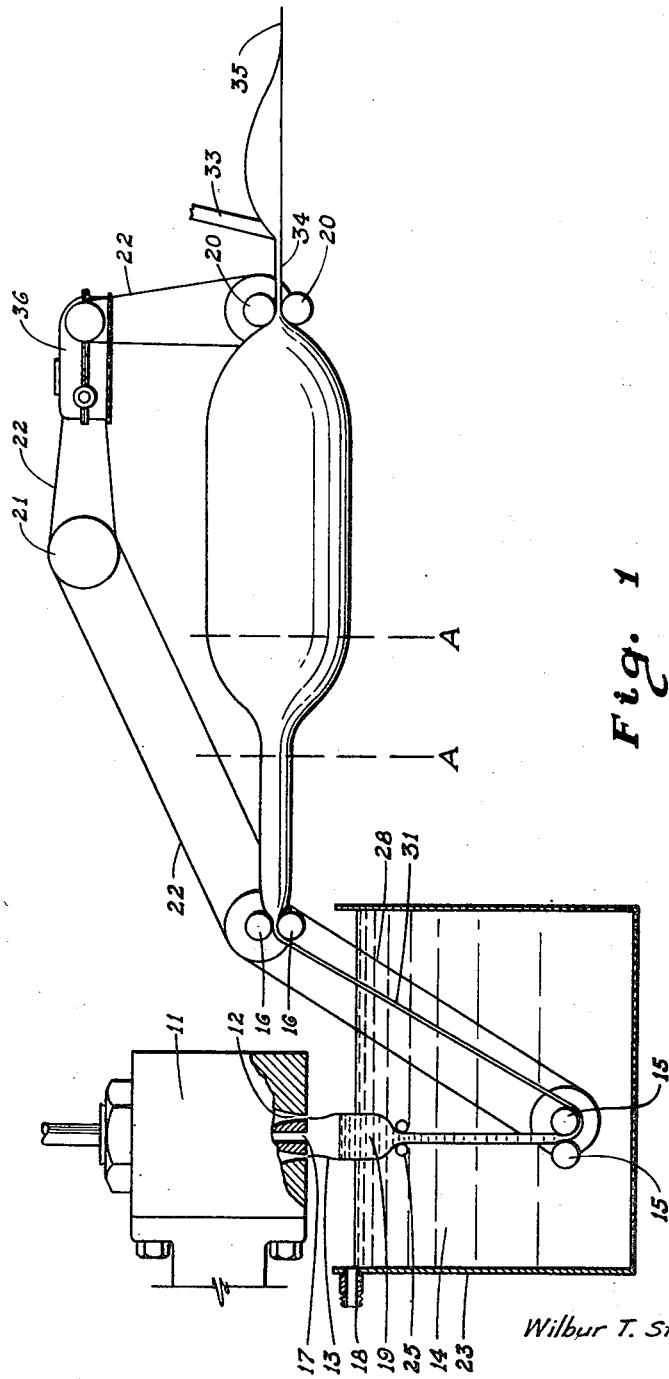
Fig. 1 is an elevation, in partial section, of an apparatus for carrying out the invention.

Referring now to Fig. 1, a fused, normally crystalline, vinylidene chloride polymer is extruded through a ring die orifice 12 in a die head 11 to form a soft plastic tube 13. The die head is positioned to extrude the tube downwardly into a cooling bath 14 maintained at a temperature within the range wherein the extruded tube is quickly chilled and supercooled without substantial crystallization. The distance between the die orifice and the surface of the cooling liquid is kept small, usually less than about 6 inches and preferably between 0.5 and 1.75 inches, to avoid undesirable distortion of the soft, substantially fused, freshly extruded tube and also to minimize crystallization of the polymer before it enters the cooling bath. Although the extrusion temperature and the temperature of the cooling bath depend upon the nature of the polymer being extruded, the extrusion is preferably carried out at a temperature between about 120° and 190° C., and the cooling bath, which may be water or other liquid inert to the polymer, is usually maintained at a temperature between 0° C. and about 40° C. and preferably between 0° and 20° C. Extrusion temperatures at which decomposition of the polymer occurs should be avoided.

The extruded tube is withdrawn from the die orifice downwardly through the cooling bath as by a pair of driven pinch rolls 15 immersed in the cooling liquid. The two rolls 15 are usually both driven, as by way of gears 10 of Fig. 3 to prevent slippage on the supercooled tube. Tube guides 25, such as a pair of closely spaced stationary rods, may be provided, if desired, between the die orifice and the rolls 15. The peripheral speed of the rolls 15 may be regulated to control the rate of withdrawal of the tube from the orifice 12. The speed of withdrawal should be at least as great as and preferably at least 10 per cent greater than the speed of the polymer through the die orfice 12 to avoid undue sagging of the semi-fluid plastic as it issues from the die orifice. Other ways of conducting the tube through the cooling bath are apparent, one such way being illustrated in Fig. 2 wherein the extruded tube 13 is drawn downwardly through the bath and through a series of spaced rolls 29 driven as by a chain 28.

Figure 2:
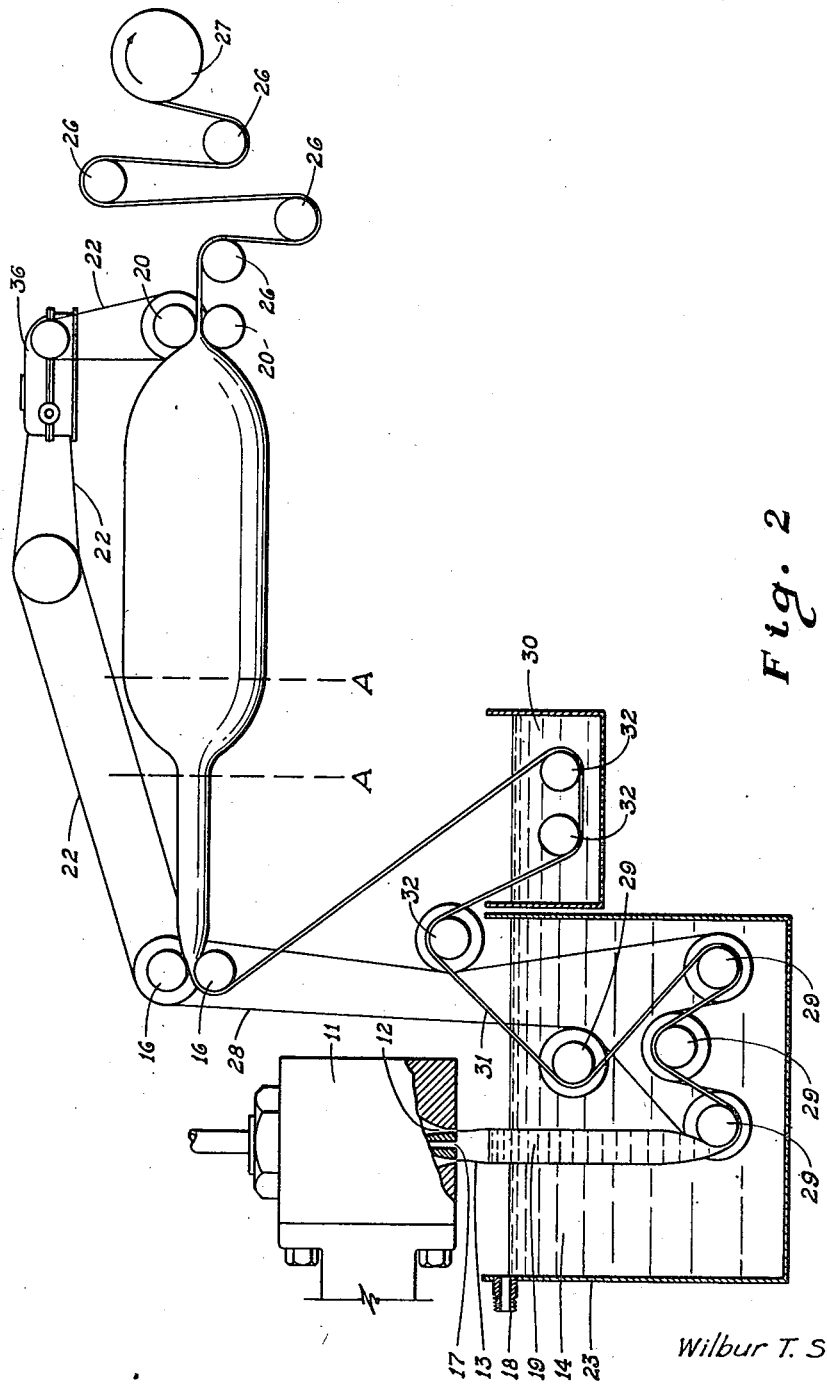
Fig. 2 is a similar elevation of a modification of the apparatus illustrated in Fig. 1.

As the tube is drawn through the cooling bath a liquid 19, inert to the polymer and suitably a mineral oil or other lubricant which will prevent the walls of the tube from sticking together when the tube is pressed flat, is fed through a duct 17 in the die head into the newly formed tube and maintained therein at a substantially constant head with respect to the level of the cooling fluid 14. The specific gravity of the lubricating liquid 19 is preferably near that of the water or other liquid in the cooling bath 14. When it is somewhat less than that of the cooling liquid the tube is partially collapsed, as illustrated in Fig. 1, by the outside pressure on it as it passes downwardly through the bath, the extent of such collapse depending upon the head of liquid maintained inside the tube. When the specific gravity of the liquid inside the tube is somewhat greater than that of the cooling liquid the tube tends to remain distended, as shown in Fig. 2, until it is collapsed by the first of the forwarding rolls. The cooling liquid may be maintained at a constant level as by a constant level overflow 18 in the wall of the cooling liquid container 23 or by other convenient means. Pinch rolls 15 of Fig. 1, or the series of rolls 29 of Fig. 2, serve to prevent the carrying of other than traces of the lubricating liquid 19 out of the cooling zone by the moving tube.

The diameter and wall thickness of the supercooled tube depend upon the dimensions of the die orifice, the head of liquid maintained within the tube and the speed with which the tube is drawn from the orifice. When, with a particular orifice, the head of liquid 19 inside the tube is kept relatively large, the soft, pliable tube of semi-fluid plastic is expanded radially immediately after emerging from the die orifice into a tube of larger size with a corresponding reduction in thickness of the tube wall. When, on the other hand, the head is relatively small, i. e. when the level of the liquid inside the tube is maintained at or near the level of the cooling liquid, the soft extruded tube may tend to shrink somewhat radially and to become smaller in diameter than the diameter of the die orifice. The wall thickness and, to some extent, the diameter of the tube may be further controlled readily by regulating the speed with which the tube is withdrawn from the die orifice as by the pinch rolls 15 of Fig. 1 or by driven rolls 29 of Fig. 2. The faster the tube is withdrawn the thinner will be its wall and the greater will be the tendency for it to become smaller in diameter. By adjusting the rate of withdrawal of the tube from the die orifice and the head of the liquid 19 within the tube, the diameter and wall thickness of the supercooled tube may both be controlled readily and simultaneously. It is understood, of course, that it is usually advantageous to employ a die orifice which will extrude a tube having a diameter which approximates the diameter desired and a wall somewhat thicker than that desired and then to adjust the peripheral speed of the pinch rolls 15 or of the series of rolls 29 and the head of the liquid 19 to give the desired diameter and wall thickness. Although the wall thickness of the tube may be reduced greatly and to substantially any desired degree by increasing the peripheral speed of the rolls 15, the process operates best when large changes in diameter of the soft pliable extruded tube are avoided, e. g. when the head of liquid within the tube does not exceed about 1.25 inches of water pressure. The head of liquid is usually positive in value, although in some instances it may be advantageous to employ a head having a small negative value, i. e. to maintain the level of the liquid 19 inside the tube slightly below that of the cooling bath 14.

Figure 3:
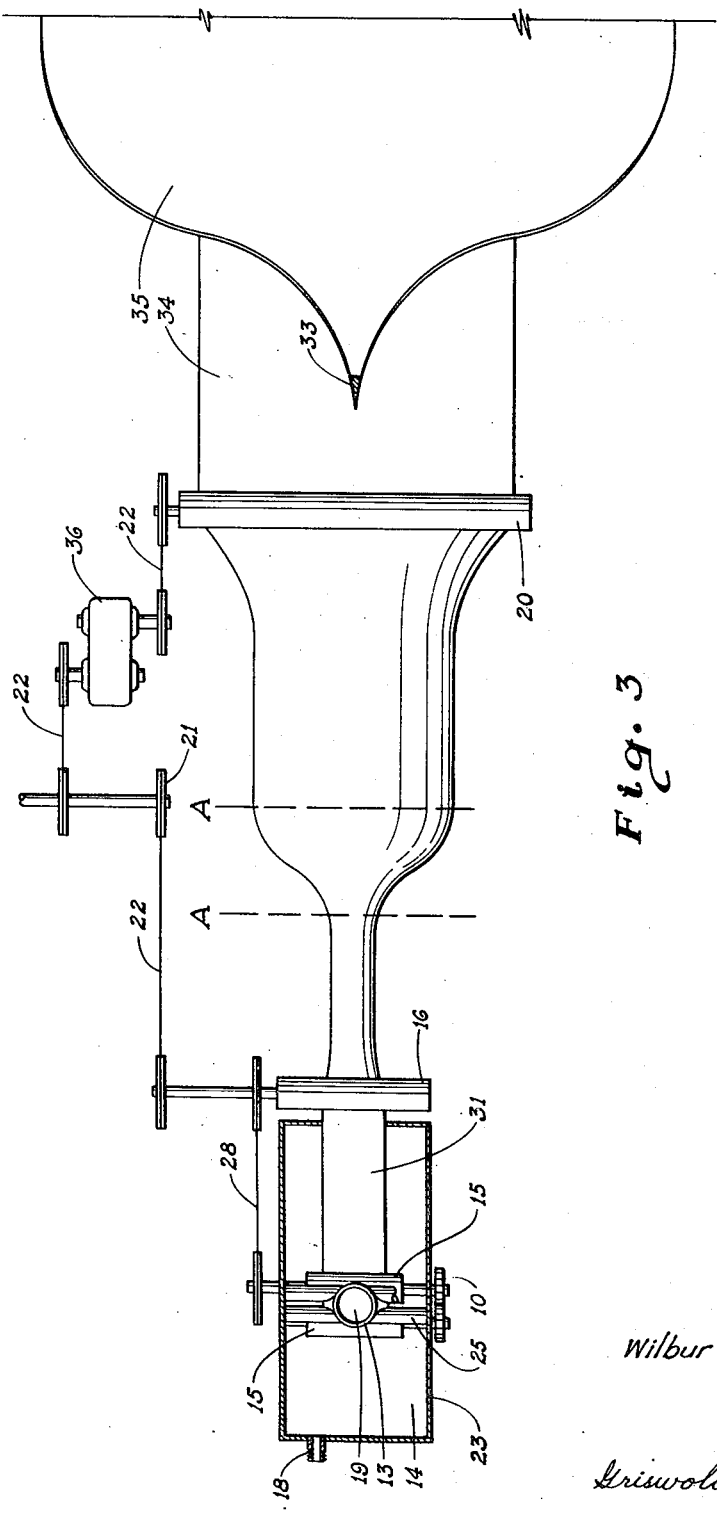
Fig. 3 is a plan view of the apparatus of Fig. 1.
Figure 4:
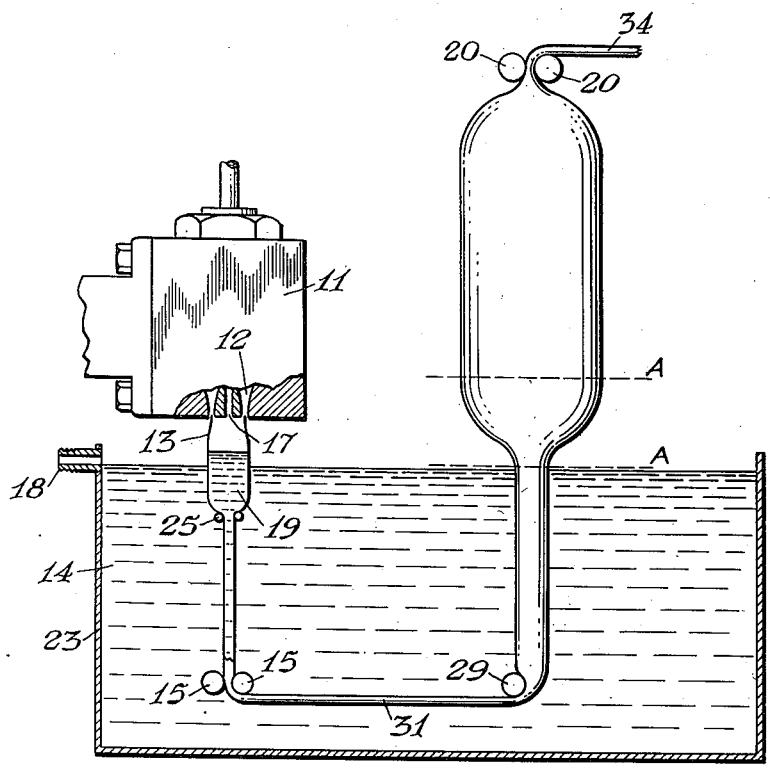
Fig. 4 is an elevation of another modification of the apparatus in operation.

The operation of the apparatus of Fig. 4 is similar to those of Figs. 1–3, except that the supercooled tube emerges vertically from bath 14, and is expanded between guide roll 29 and pinch rolls 20, after passing pinch rolls 15, in the manner to be described for the other forms of the apparatus. In this modification, the stretching zone A—A, to be described later, is immediately above the surface of bath 14.

It should be pointed out that it is frequently desirable to supercool the extruded tube as rapidly as possible to prevent substantial crystallization therein prior to cold-stretching and subsequently to cold-stretch the supercooled tube at a somewhat higher temperature than that of the cooling bath so that the cold-stretching operation may proceed more readily. In such cases the temperature of the bath 14 may be maintained, for example, at from 0° to 20° C., and the supercooled tube then warmed in any convenient manner, as by conducting it through a separate warming zone maintained at a higher temperature of from 20° to 50° C. prior to cold-stretching. Such a warming zone is illustrated in Fig. 2 wherein the supercooled tube 31 is drawn by pinch rolls 16 over guide rolls 32 through a warming bath 30.

The supercooled and flattened tube is fed through the nips of two pairs of pinch rolls 16 and 20. (In Fig. 4, these are rolls 15 and 20.) Rolls 16 and 20 may be driven in any convenient manner as by a driving wheel 21 and chains 22, and the two pairs are stationed a distance from one another at least 5 times the diameter of the supercooled tube (in Fig. 2, this distance is illustrated as about 25 times the supercooled tube diameter). A variable speed drive 36 may be provided to enable adjustments to be made in the relative peripheral speeds of the rolls 16 and 20. Each pair of rolls pinches the tube passing therethrough firmly together and produces a substantially gas-tight seal. A quantity of air, or other gas inert to the polymer, is introduced into the section of the tube lying between the pinch rolls 16 and 20 in amount sufficient to cold-stretch the tube wall and thus to distend the tube with the formation therein of a bubble having a diameter larger than that of the supercooled tube. The amount of gas is such that the introduction of additional quantities of gas results in the lengthening of the bubble without substantially increasing its diameter.

Generally speaking, cold-stretching of a normally crystalline vinylidene chloride polymer, e. g. in sheet or filament form, may be carried on up to a certain point, which point is substantially a function of the particular polymer or composition thereof involved, with only a gradual increase in the force over that necessary to initiate the cold-stretching. Further stretching of the polymer requires a large and rapid increase in the force applied and soon results in rupture of the sheet or filament. Thus, in the present instance, the tube after it emerges from the first set of pinch rolls 16 and before it passes between the second set of pinch rolls 20 is distended, due to the gas enclosed in it, i. e. it is cold-stretched both radially and longitudinally, while traversing a relatively short region A—A, between and removed from rolls 16 and 20. Such simultaneous longitudinal and radial cold-stretching of the tube leads to a planar orientation of the crystallites within the tube wall, thus increasing its strength not only longitudinally but transversely as well. The location with respect to the rolls 16 and 20 of the region wherein the cold-stretching occurs depends largely upon the amount of gas enclosed within the section of the tube between the rolls. Thus, when the amount of gas is relatively small, the region of distention or cold-stretching lies near the last set of rolls 20. When the amount of enclosed gas is increased the region of cold-stretching moves near the first set of rolls 16, the diameter of the cold-stretched portion of the tube remaining substantially constant regardless of the region in which the cold-stretching occurs. When, as mentioned above, the amount of gas enclosed in the section of the tube between the rolls 16 and 20 is such that the addition of an additional quantity of gas results in the lengthening of the bubble without substantial further increase in its diameter, the region of cold-stretching is maintained far enough away from each of the pairs of pinch rolls 16 and 20 so that the symmetrical cold-stretching of the tube is not interfered with by actual contact of the rolls with the tube within the region of cold-stretching.

Although a small distension of the tube may occur between the first rolls 16 and the region of cold-stretching, the ratio of the diameter of the cold-stretched portion of the tube to that of the supercooled but unstretched portion is substantially constant for any particular wall thickness of the supercooled tube and for any particular normally crystalline vinylidene chloride polymer, and it is thus apparent that for any particular die orifice the diameter of the final cold-stretched tube is dependent in large measure upon the head of liquid 19 maintained in the hot extruded tube before it is chilled and upon the speed with which the tube is drawn from the die orifice 12. The pressure of the gas enclosed within the tube between the rolls 16 and 20 is automatically determined by the diameter and wall thickness of the supercooled tube and by the properties of the particular polymer involved, but is usually of the order of from a few ounces to a few pounds per square inch. The cold-stretching operation is usually carried out at a temperature of from 10° to 50° C. and preferably at from 20° to 40° C. it being understood that, although considerable rise in temperature of the tube wall may occur during stretching, these temperatures refer to the temperature of the tube as it enters the cold-stretching zone.

Rolls 15 of Fig. 1, or the series of rolls 29 of Fig. 2, and rolls 16 are operated at substantially the same peripheral speed although, if desired, rolls 16 may be operated at a slightly higher peripheral speed than rolls 15 or 29 to insure there being no slack in the supercooled tube. Rolls 15 or 29 may, if desired, be driven from rolls 16 as by a chain 28. To take up the slack in the tube due to the longitudinal stretching which occurs between the pinch rolls 16 and 20, and. if desired, to increase somewhat the degree of longitudinal cold-stretching of the tube, the last pair of rolls 20 are run at a peripheral speed greater, usually from 2 to 4 times as great, than that of the first pair of pinch rolls 16, depending upon the amount of additional longitudinal cold-stretching desired.

As indicated previously, the degree of longitudinal stretching may be controlled somewhat by proper adjustment of the peripheral speed of the last pair of pinch rolls 20 with respect to that of the first pair 16. Generally a given length of the supercooled tube will be stretched to from 2 to 3.25 times its length during the cold-stretching operation and occasionally up to 4 times its length depending upon the particular polymer involved and other factors. The wall of the tube is usually stretched in a direction transverse to the longitudinal axis of the tube to from 3 to 5 times its original dimension as measured on the supercooled tube. This may be stated differently by saying that, as a rule, a section of the wall of the supercooled tube 1 inch square will, after passing through the cold-stretching zone A—A, be in the form of a rectangle measuring from 2 to 3.25 inches or more in the longitudinal direction of the tube and from 3 to 5 inches in a direction transverse thereto. Very little stretching of the tube wall occurs in either direction after it has passed the region of cold-stretching. Although a large increase in the tensile strength of the tube wall occurs due to the orientation which is caused by the cold-stretching, the tensile strength of the multi-directionally stretched film is usually less in the longitudinal direction than in the direction transverse thereto. This follows from the greater stretching in the transverse direction. Although the tensile strength of the cold-stretched tube wall depends, among other factors, upon the particular polymer or copolymer involved, films are readily prepared by slitting tubes after cold-stretching by the herein-described method which have a tensile strength in the direction parallel to the longitudinal axis of the tube of from 6,000 to 7,000 pounds per square inch and of from 8,000 to 10,000 pounds per square inch in the transverse direction.

The flattened, multi-directionally stretched tube obtained by the process may be used or treated in any desired manner. Thus, it may be passed over a series of smoothing rolls 26 of Fig. 2 and collected on a drum 27 for storage, or it may be cut into lengths and one end of each length sealed to make a bag. Alternatively, the tube may be slit lengthwise, as by a knife 33 of Fig. 1, and unfolded to produce a film characterized by its high strength in both longitudinal and transverse directions. This latter slitting operation is illustrated more clearly in Fig. 3, wherein the flattened fully oriented tube 34, after issuing from between the rolls 20, is slit longitudinally by the knife 33, and unfolded to produce a film 35. Multiple slitting means may of course, be employed to produce multiple continuous films, or the folded edges of the flattened tube may simply be trimmed off to leave two flat films of substantially the width of the flattened tube.

In operating the process, the cooling bath is regulated at a predetermined temperature and the extruder is started. The extruded tube is fed between the tube guides 25 and through the rotating rolls 15, of Fig. 1, or the series of rolls 29 of Fig. 2, then, if desired, over the guide rolls in the warming bath 30, and finally through pinch rolls 16 and 20. A quantity of a liquid lubricant is introduced into the tube through the inlet 17 in the die head. Air or other inert gas is then introduced into the section of tube between the rolls 16 and 20, one convenient way being by means of a hollow needle. The wall of the supercooled section is punctured with the needle and gas is injected into the tube through the needle. The needle is withdrawn when sufficient gas has been injected to cause the region A—A of cold-stretching of the tube to lie at a point sufficiently removed from the rolls 16 and 20 to eliminate any possibility of the tube within the region being deformed by the rollers. The hole left in the tube wall by the needle may be closed by the finger until just before it passes between the rolls 20 and the loss of gas from inside the tube thus limited to a small amount. Further quantities of inert gas may be injected into the tube at any time by the same method and without arresting the process. The speed of the rolls 15 or 29, 16 and 20 and the amount of liquid lubricant 19 are then regulated until the flattened cold-stretched tube issuing from the last pair of pinch rolls 20 has the desired diameter and wall thickness. The level of the liquid lubricant 19 in the tube 13, may, if desired, be lowered by inserting a tube of small bore through the inlet 17 and withdrawing the liquid by suction. If desired, the liquid lubricant may be cooled, e. g. it may be continuously withdrawn and replaced with cooler liquid to chill the extruded tube wall from its inner as well as its outer surface and hasten its supercooling.

In a typical example of the process of the invention a copolymer prepared by polymerizing a mixture containing 85 per cent vinylidene chloride and 15 per cent vinyl chloride, and compounded with 7 per cent of its weight of di-(alpha-phenylethyl) ether as a plasticizer, was extruded at a temperature of 170° to 173° C. through a circular die orifice having an outside diameter of 2.50 inches and an internal diameter of 2.38 inches. The tube, while still hot, was conducted into a bath of water maintained at from 2° to 7° C. in order to supercool the copolymer. A quantity of high boiling petroleum oil having a specific gravity of about 0.870 at 20° C. was maintained inside the tube so that its surface was from ½ to 1 inch above that of the cold water bath. The copolymer was extruded at a rate of 75 pounds per hour. The supercooled tube was passed between a first pair of pinch rolls rotating at a peripheral speed of from 9 to 10 feet per minute and subsequently between a second pair of pinch rolls rotating at a peripheral speed of from 23 to 26 feet per minute. Compressed air was introduced, by means of a hollow needle, into the section of the tube lying between the first and second set of pinch rolls until a portion of the section was distended with the formation of a bubble of diameter larger than the diameter of the supercooled tube and the introduction of further air resulted only in the elongation of the distended bubble and not in any further substantial increase in its diameter. It was found that the pressure of the air within the tube was between 1 and 1.5 pounds per square inch. The multi-directionally stretched and flattened tube which issued from between the second pair of pinch rolls was passed under considerable tension over a series of smoothing rolls and eventually wound on a drum for storage. The supercooled tube, after passing through the first set of pinch rolls, had a diameter of 2.37 inches and a wall thickness of about 0.025 inch. After cold-stretching, the tube had a diameter of about 12 inches and a wall thickness of between 0.002 and 0.0025 inch. A section of the cold-stretched tube was slit longitudinally, unfolded, and smoothed to form a film having a width of over 37 inches.

In a similar operation, a somewhat softer but still crystalline copolymer consisting of about 75 per cent vinylidene chloride and 25 per cent vinyl chloride, plasticized with 7 per cent of its weight of di-(alpha-phenyl ethyl) ether to form a composition having a fusion point of about 143° C., was extruded as a 2.5 inch tube into a water bath held at 30° C., to effect supercooling. The extruded tube was filled with oil, as before, and was passed through pinch rolls 15 of the apparatus of Fig. 4, thence around guide roll 29, and was removed vertically from the bath and drawn through second pinch rolls 20. The tube was inflated as before, and the cold stretching zone A—A was positioned just above the surface of the cooling bath. Rolls 20 were driven at a rate about 3.5 times that of rolls 15, producing a 2.5-fold longitudinal stretch, and the radial distention of the tube was found to be about 4 times the radius of the original extruded tube. The fully stretched tube was highly crystalline, and had the characteristic strength of oriented crystalline vinylidene chloride copolymers, exhibiting values of about 7,000 pounds per square inch in the longitudinal direction and about 8,500 pounds per square inch in the transverse direction.

I claim:

1. The method which includes continuously extruding a tube of fused normally crystalline vinylidene chloride polymer at a temperature between 120° and 190° C.; withdrawing the tube downwardly from the die orifice through a cooling bath, the surface of which is less than about 6 inches below the orifice and the temperature of which is maintained at a constant value between 0° and about 40° C. to supercool the tube, at a speed greater than the speed of the polymer through the die orifice, while maintaining a predetermined head of a lubricating liquid within the tube to regulate the diameter and wall thickness of the super-cooled tube and to lubricate its inner surface; flattening the tube and advancing it through the nips of a first and a second pair of pinch rolls, which pairs are stationed a distance from one another at least 5 times the diameter of the supercooled tube; introducing and maintaining a gas in the section of tube between said pairs of rolls in amount more than sufficient to fill the tube to its supercooled diameter and sufficient to establish a positive internal pressure and to distend the tube a portion of the distance from the second said rolls back toward the first said rolls, to from 3 to 5 times the diameter of the supercooled tube, but insufficient to distend the tube to such enlarged diameter the entire distance between said pairs of rolls, thereby cold-stretching the tube in a zone intermediate between and removed from the two sets of rolls, the amount of gas employed being so limited that introduction of an additional quantity thereof results in lengthening of the enlarged bubble and displacement of the cold-stretching zone toward the first pair of rolls, without material increase in the diameter of the enlarged bubble; and driving the second pair of pinch rolls at a peripheral speed of from 2 to 4 times that of the first pair of pinch rolls.

2. The method which includes continuously extruding a tube of fused normally crystalline vinylidene chloride polymer at a temperature between 120° and 190° C.; withdrawing the tube downwardly from the die orifice through a cooling bath, the surface of which is less than about 6 inches below the orifice and the temperature of which is maintained between 0° and about 20° C. to supercool the tube, at a speed greater than the speed of the polymer through the die orifice, while maintaining a predetermined head of a lubricating liquid within the tube, thereby to regulate the diameter and the wall thickness of the tube and to lubricate its inner surface; warming the supercooled tube to a temperature between 20° and 50° C.; passing the warmed tube successively between a first and a second pair of driven pinch rolls stationed a distance from one another at least 5 times the diameter of the supercooled tube; maintaining a gas in the section of tube between said pair of rolls in amount sufficient to cold-stretch the tube, in a zone intermediate between and removed from the two sets of rolls, with the formation therein of an elongated bubble having a diameter from 3 to 5 times that of the supercooled tube, the amount of gas being such that the introduction of an additional quantity of gas results in the lengthening of the bubble without substantial further increase in its diameter; and driving the second pair of said rolls at a peripheral speed of from 2 to 4 times that of the first pair of said rolls.

3. The method which includes: continuously extruding a tube of fused normally crystalline vinylidene chloride polymer at a temperature between 120° and 190° C.; withdrawing the tube downwardly from the die orifice through a cooling bath, the surface of which is from 0.5 to 1.75 inches below the orifice and the temperature of which is maintained at between 0° and 20° C. to supercool the tube, at a speed greater than the speed of the polymer through the die orifice, while maintaining a predetermined head of a lubricating liquid within the tube to regulate the diameter and wall thickness of the tube and to lubricate its inner surface; passing the supercooled tube through a warming bath maintained at a temperature between 20° and 50° C.; passing the warmed tube successively between a first and a second pair of driven pinch rolls stationed a distance from one another at least 5 times the diameter of the supercooled tube; maintaining a gas in the section of tube between said pairs of rolls in amount sufficient to cold-stretch the tube, in a zone intermediate between and removed from the two sets of rolls, with the formation therein of an elongated bubble having a diameter from 3 to 5 times larger than that of the supercooled tube, the amount of gas being such that the introduction of an additional quantity of gas results in the lengthening of the bubble without substantial further increase in its diameter; and driving the second pair of said rolls at a peripheral speed of from 2 to 4 times that of the first pair of said rolls.

WILBUR T. STEPHENSON.

REFERENCES CITED

The following references are of record in the file of this patent:

UNITED STATES PATENTS

| Number | Name | Date |
|---|---|---|
| 2,176,925 | Reichel et al. | Oct. 24, 1939 |
| 2,183,602 | Wiley | Dec. 19, 1939 |
| 2,291,670 | Wiley et al. | Aug. 4, 1942 |

FOREIGN PATENTS

| Number | Country | Date |
|---|---|---|
| 524,777 | Great Britain | Aug. 14, 1940 |